Patented Sept. 6, 1949

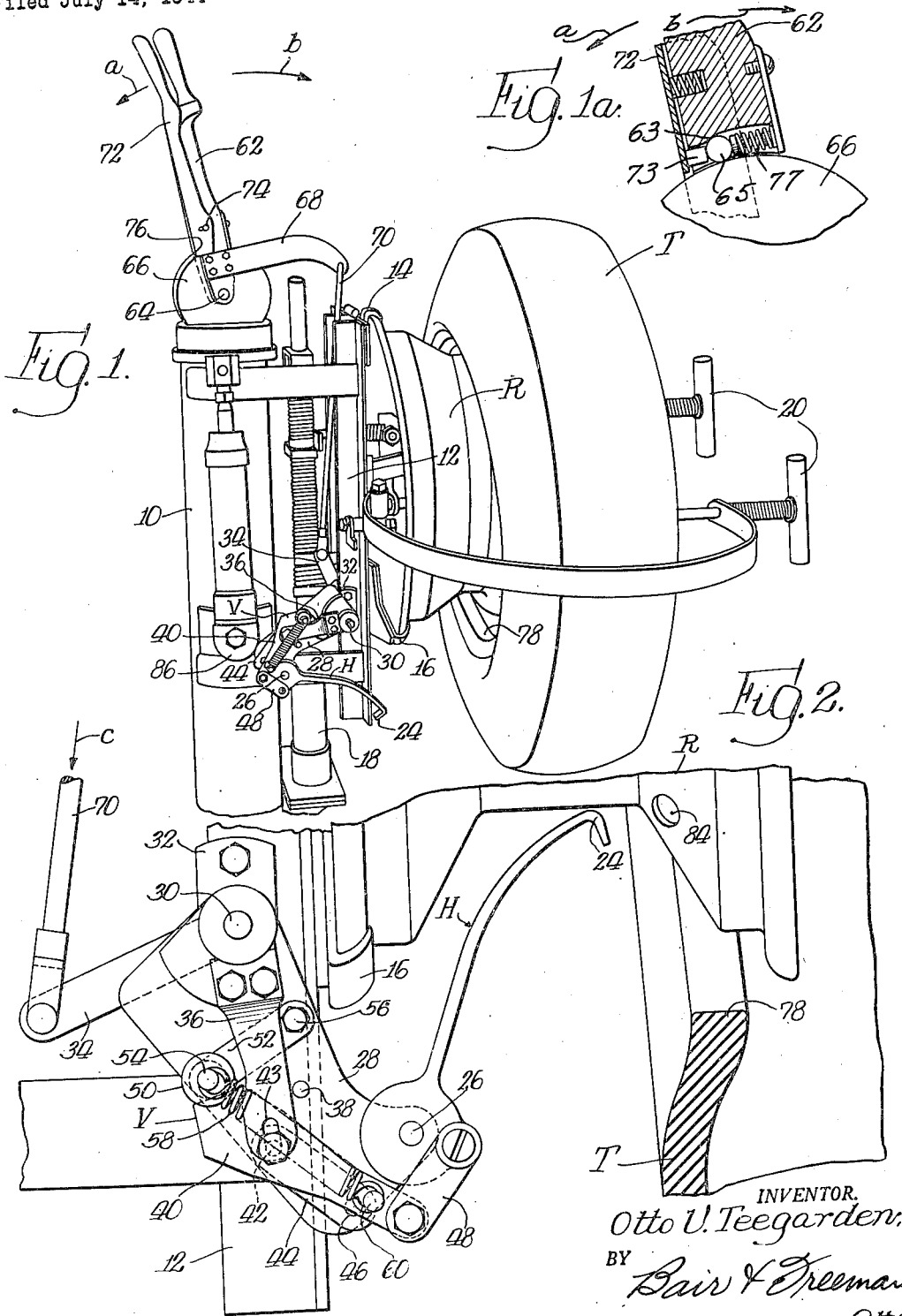

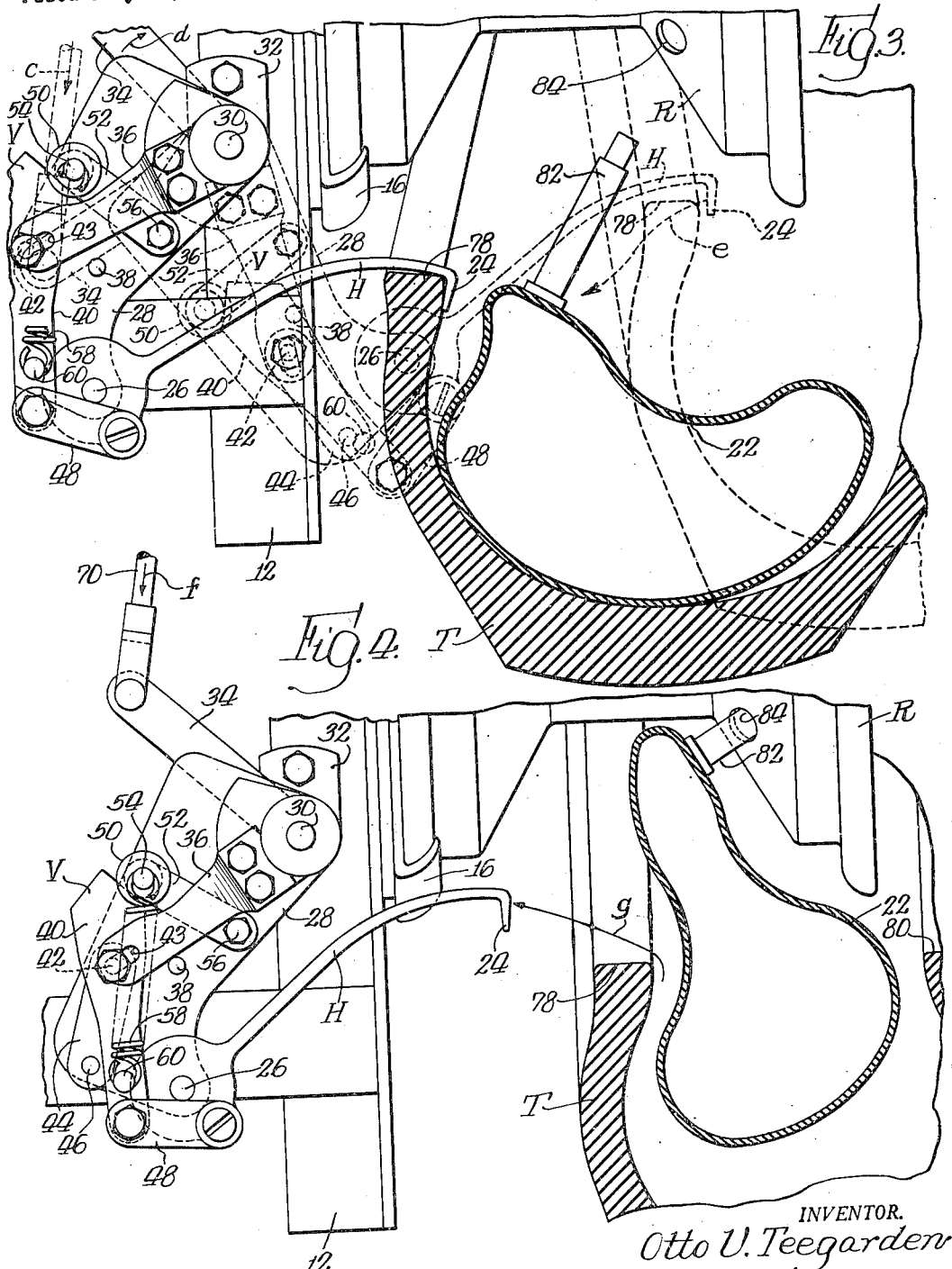

2,481,041

UNITED STATES PATENT OFFICE 2,481,041

TIRE STAND ACCESSORY

Otto V. Teegarden, Goshen, Ind.

Application July 14, 1944, Serial No. 544,938

6 Claims. (Cl. 144—288)

My present invention relates to an accessory for a tire stand of the kind that is adapted to support a rim while the tire casing is being partially removed and replaced relative to the rim, such as the tire stand shown in my copending application, Serial No. 492,684 filed June 29, 1943, issued December 24, 1946 as Patent No. 2,413,010.

One object of the invention is to provide an accessory which is in the nature of a tire casing bead engaging hook for engaging the back bead of a casing while the front bead is held by other means and holding the back bead in a desired position while the user of the tire stand is inserting the valve stem of the inner tube through the opening provided therefor in the rim on which the tire casing is mounted.

Another and important object of the invention is to provide a bead hook of this general character and a means for supporting and manipulating it which causes the bead hook to pass through a desired cycle of operations in an automatic manner by mere movement back and forth of a single manually operable lever without the necessity of auxiliary controls and the attendant complications therefor as in my co-pending application.

A further object is to provide a bead engaging hook which at one time is resiliently biased in one direction and at another time is resiliently biased in an opposite direction, all of which is accomplished by the mere movement back and forth of the manually operable lever without any premeditated thought on the part of the operator.

Still a further object is to provide an arrangement of rock shaft, main lever, hook operating lever with associated resilient snap acting mechanism and bead engaging hook so related to each other and operable from a manual control lever that the desired cycle of operations is performed in a given sequence and in such manner as to minimize the time of the operator in the valve stem inserting step of a tire changing operation.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a perspective view of a portion of a tire stand with my accessory mounted thereon and shown in a retracted or out-of-the-way position during one step of a tire replacing operation.

Figure 1a is an enlarged and partial sectional view of the lever at the top of Figure 1.

Figure 2 is an enlarged view of the accessory itself showing it moved to a position ready for the commencement of a snap action operation that changes the position of the bead engaging hook.

Figure 3 is a similar view showing in dotted lines the engagement of the bead hook with the tire bead and in solid lines a subsequent movement for engaging the hook portion of the bead hook with the tire bead and pulling the bead rearwardly toward the tire stand, and Figure 4 is a view similar to Figure 3 wherein the bead hook has been released from the tire bead and may thereafter be returned to the initial position of Figure 1.

On the accompanying drawings I have used the reference numeral 10 to indicate a stand or post of a tire stand. Supported on the post 10 is a guide-way arrangement 12 having a stationary hook 14 at its upper end and a pair of slidable hooks 16 therebelow. The hooks 14 and 16 are adapted to engage a tire rim R for rigidly holding it in position, the mechanism for effecting such engagement including a hydraulic jack 18 and associated mechanism as shown in my copending application.

Present day rims are mostly of the "drop-center" type as illustrated and the tire for the rim is shown at T. In Figure 1 the rear bead of the tire casing T has been dropped into the drop-center of the rim R and a pair of C hooks 20 have been manipulated as described in my co-pending application to spread the tire casing and thereby facilitate removal and replacing of the tire tube 22 (see Figure 3) with respect thereto. The parts so far described form no part of my present invention.

My present invention has to do with an accessory for the tire stand comprising a bead engaging hook H having a hook portion 24 and a pivot 26. The pivot 26 is carried by a main lever 28 which is freely pivoted on a rock shaft 30. The rock shaft 30 is journalled in a bracket 32 secured to the guide-way 12 and has rigidly secured thereto a pair of levers 34 and 36. A stop pin 38 is provided for the main lever 28 to, at times, engage a flange of the guide-way 12 as shown in Figure 2.

Also pivotally related to the main lever 28 is a hook operating lever 40. It is mounted in pivotal relation at 42 to one end of a link 44 which, in turn, is pivoted at 46 to the main lever. The hook operating lever has a link connection 48 with the bead engaging hook H as clearly shown in Figure 2 and has its opposite end arranged in the form of a V indicated at V. Cooperating with the V is a roller 50 journalled on a link 52 as by a stud 54, the link 52 being in turn pivotally mounted at 56 on the main lever 28. For engaging the roller 50 with the V of the lever 40 and thereby effecting an over-center movement of the lever that biases it in either one of two directions, I provide a spring 58 connected to the stud 54 and to a second stud 60 mounted on the lever 40 adjacent the link 48. When the roller 50 is on the right side of the V it biases the hook H counter-clockwise and when it is on the left side of the V, it biases the hook clockwise. The point of the V thereby constitutes a center position, and when the roller is on either side of the V or "over-center," the direction of bias for the hook is reversed. This mechanism can accordingly be considered broadly as an "over-center" mechanism.

For operating the hook H, I provide a manual lever 62 pivoted at 64 to a bracket 66 on the top of the post 10. The lever 62 has an extension 68 which is operatively connected to the lever 34 by means of a rod 70. The bracket 66 is a disc, the peripheral edge of which is formed on a radius from the pivot 64 and a release lever 72 is pivoted at 64 to the disk. The manual lever 62 has a cam surface 63 (see Figure 1a) between which and the disk a roller 65 is mounted. The roller engages the disc edge for permitting free movement of the lever 62 in the direction of an arrow a but preventing movement thereof in the direction of the arrow b except when the release lever 72 is moved toward the lever 62 by squeezing the two in the hand. A projection 73 on the release lever 72 then moves the roller 65 against the bias of a spring 77 away from the cam surface 63 so that it no longer wedges between this surface and the periphery of the disk 66.

Practical operation

In the operation of my tire stand accessory, it and its associated parts are normally in the position of Figure 1. The hook H in this instance is rearward of the plane of the rear edge of the rim R so that it is out of the way during removal of the tire T from its mounted position on the rim R to the position shown in Figure 1 and during the removal of the inner tube 22 in relation to the tire casing.

Before the inner tube is replaced and while the tire casing is dropped into the drop center of the rim as shown in Figure 1, the C hooks 20 are spreading the tire casing. It is now desirable to get the bead hook H into position for subsequent engagement with the rear bead of the casing. This is accomplished by grasping the levers 62 and 72 and pulling them forwardly in the direction of the arrow b which results in the rod 70 moving downwardly as indicated by the arrow c in Figure 2. The entire assembly of main lever 28, hook operating lever 40, link 48 and hook H move as an integral assembly with the rock shaft 30 and its levers 34 and 36 from the position of Figure 1 due to the spring 58 holding the roller 50 in a position adjacent the lower end of the right hand incline of the V to the position of Figure 2 where the main lever is stopped by its pin 38 engaging the guide 12 or in the case of a rim having a relatively narrow drop-center the hook portion 24 of the hook may engage the rim and serve as a stop.

At this time the lever 62 is pulled farther forward while the rear bead is manually pushed rearwardly from the position of Figure 2 to the dotted position of Figure 3 for the purpose of snapping the roller 50 over the V of the lever 40. Since the main lever 28 has been stopped in its movement, further downward movement of the rod 70 will cause the lever 36 to swing the hook operating lever 40 clockwise in Figure 2 as to the dotted position in Figure 3. The lever 36 has a slot 43 cooperating with the pin 42 to permit this movement. Said movement moves the right hand side of the V to lift the roller and as soon as the roller passes the crest of the V, the spring 58 will act to lower the roller along the left hand side of the V and thereby bias the lever 40 clockwise instead of counter-clockwise. This biases the hook H downwardly instead of upwardly. The result is a swinging of the hook from the position of Figure 2 to the dotted position of Figure 3 wherein it engages the rear bead 78 of the tire casing T (dotted position).

The lever 62 is now swung in a return direction (arrow a Fig. 1) to first swing the entire assembly 34—36—28—40—48 and H to the solid line position of Figure 3 while the C hooks 20 still hold the outer bead 80 at about the same position. After a little resistance is offered to the pull of the hook by the tire casing, further rearward movement of the lever 62 will result in the V-over-roller connection again changing position as from the dotted position to the full line position in this figure as the lever 34 is further swung in the direction of the arrow d.

The hook H is now biased upwardly again by the spring 58 instead of downwardly but since there is considerable friction between the hook 24 and the bead 78, the hook H does not fly upwardly but remains in engagement with the bead for pulling it as to the position shown in solid lines. With the casing thus held, the lower half of the inner tube 22 can be easily inserted and the casing will not interfere with the insertion of the valve stem 82 into the valve stem opening 84 of the rim R. The operator can insert his hand through the space between the bead 80 and the rim R while the tire casing remains spread by the C hooks, and has plenty of room in which to align the valve stem with its opening 84 and insert it whereas, without the hook H, the space would be quite cramped and it would be difficult to do the job quickly. Considerable time is thereby saved.

After the valve stem has been inserted, the upper half of the inner tube can be readily inserted over the front side of the rim and laid in the channel of the rim. The C hooks can now be released. The hook H is then released from the position shown by solid lines in Figure 3 as it is no longer needed. This is accomplished in a simple manner by moving the lever 62 in the direction of the arrow b again so that the rod 70 then moves downwardly as indicated by the arrow f in Figure 4. This moves the hook portion 24 from engagement with the bead 78 so that the spring 58 through the V-over-roller connection can snap the hook H upwardly and rearwardly as in Figure 4. Thereafter the lever 62 may be moved back in the direction of the arrow a for retracting the hook H to its initial position shown in Figure 1. In such position it may be stopped by any suitable means such as a bracket 86 for one of the hydraulic operating mechanisms of the tire stand.

The mechanism disclosed results in a step by step movement of the bead engaging hook H whereby the shifting of the hand operated lever 62 will (1) bring the support 28 of the bead hook into operative position (the rotation of the entire lever-link-hook asembly as a rigid unit upon pivot 30); then (2) as the support 28 reaches the proper position, the rotation of the entire lever-link-hook assembly is automatically stopped, and further shifting of the hand operated lever in the same direction merely swings the bead hook to engage the tire bead, (the rotation of the bead hook upon pivot 26—dotted position of Figure 3—the positive stopping of the rotation of the entire assembly by 38 engaging 12 resulting in the arm 36 moving the V toward the right, relative to the roller 50, thus moving the arm 40 over-center to the dotted position of Figure 3 as the spring which kept the whole assembly rigid in operation stretches and then contracts, the contraction tending to rotate the arm 40 clockwise about the pivot 42, thus biasing the hook H downwardly to the dotted position of Figure 3); then (3) upon shifting the hand operated lever in the reverse direction, the support 28 and the pivot 26 of the bead hook is moved back, thereby spreading the tire (the rotation of the entire link-lever-hook assembly as a rigid unit upon pivot 30 to the solid line position of Figure 3, resulting in the resistance offered by the tire being less than the tension of the spring 58 which holds the assembly rigid in operation); and (4) when the resistance offered by the tire becomes greater than the tension of the spring 58, the spring yields and the V passes the roller as to the solid line position of Figure 3, but the tire casing still holds the hook, the tire being still spread, and enables the release of the bead hook by shifting the hand operated lever in the same direction as initially under (1), thus disengaging the hook end 24 from the bead 78 so that the hook flies up to the position of Figure 4, permitting the tire to return to its unspread position. The hand operated lever is then moved in the direction of the arrow a for getting the hook H back out of the way as in Figure 1.

My bead engaging hook, while it has a number of mechanical parts, simplifies the operations necessary for positioning the hook as it can engage the bead and bias the hook in one direction at one time and in another direction at another time. The function of the spring 58 and the hook operating lever 40 is to keep the whole assembly 28, 30, 36 and H rigid in one phase of the operation so that the support 28 for the hook end 24 can be brought into proper position by rocking the shaft 30 and to yield in another phase of the operation so as to enable the hook 24 to be pivoted upon its support 28 by further rocking of the shaft 30. Accordingly the bead hook can be operated in a desirable manner by a single lever that is swung back and forth and without the necessity of another control means for swinging the hook up and down in addition to swinging it forwardly and rearwardly. Accordingly the hook operates through a complete cycle without any special attention on the part of the operator other than the movement of the single lever 62 in the proper directions.

This greatly simplifies the operation of the hook for its intended purpose and cuts down the required time of the user in connection with inserting the valve stem through the opening 84 of the rim R. While the time saving on this one feature for a single tire is not great, it amounts to a considerable saving in time over a period of many hundreds of tire changes on the stand and therefore effects a desirable economy in operation.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a tire stand accessory, a bead engaging hook adapted to engage the lower portion of that bead of a tire casing which is dropped into a drop-center of a rim while the rim is held on a tire stand, and means for supporting and manipulating said hook comprising a main lever pivoted to the stand for moving said hook to a position for spreading the tire casing, a stop for said main lever, said hook being pivoted to said main lever for engagement with and disengagement from said bead, an oscillatable element for effecting both the movement of the main lever and the movement of the hook, and an operative connection for effecting such movements by oscillation of said element comprising an over-center resilient connection between said hook and said main lever, said oscillatable element being connected with said over-center resilient connection to move said main lever and said hook as a unit in one direction while the hook is baised by said over-center connection away from the tire bead and until the main lever is stopped by said stop, said oscillatable element upon further movement shifting said over-center resilient connection to its opposite position for engaging said hook with the tire bead, said oscillatable element upon return movement effecting spreading of the tire casing until the casing offers such resistance to spreading as to overcome the resiliency of said over-center connection thereby causing it to return to its initial position biasing said hook away from said bead but with the hook frictionally engaging the bead to prevent unhooking thereof, so that reverse movement again of the oscillatable element releases the hook from the bead and said resilient connection thereupon swings the hook away from the bead.

2. In a tire stand accessory, a bead engaging hook adapted to engage the lower portion of that bead of a tire casing which is dropped into a drop-center of a rim while the rim is held on a tire stand, and means for supporting and manipulating said hook comprising a main lever pivoted to the stand, limiting means for the movement of said main lever in one direction, said hook being pivoted to said main lever, a rock shaft, a manually operable lever for rocking said rock shaft, and an operative connection from said rock shaft to said main lever and said bead hook comprising a two-position resilient over-center means for biasing said bead hook in one direction relative to said main lever when said over-center means is in one position, and for biasing said bead hook in the opposite direction relative to said lever when said over-center means is in the other position and a link connection from said rock shaft to said resilient over-center means for swinging said main lever and said hook therewith until the bias of said over-center means is overcome by said limiting means in one direction of movement of said main lever and by the resistance offered by the tire casing to the hook in the other direction of movement of said main lever, whereupon the over-center means is changed thereby in either case to its opposite position.

3. In a tire stand accessory, a bead engaging hook adapted to engage a bead of a tire casing which is dropped into a drop-center of a rim while the rim is held on a tire stand, and means for supporting and manipulating said hook comprising a main lever pivoted to the stand, means to limit its pivotal movement in one direction, said bead hook being pivoted to said main lever, a manually operated lever, a resilient over-center means of connection between said bead hook and said main lever for biasing said bead hook in one direction relative to said main lever when said over-center means is in one position and for biasing said bead hook in the opposite direction relative to said main lever when said over-center means is in the other position, and an operative connection between said manually operable lever and said over-center means to effect movement of said main lever and said bead hook as a unit until the main lever is stopped by said means to limit its pivotal movement in one direction of movement of said main lever, or by the resistance offered by the tire casing to the hook in the other direction of movement of said main lever, whereupon the bias of the over-center means is overcome and further movement of the main lever moves the hook in the opposite direction.

4. A tire stand accessory of the character disclosed comprising a bead engaging hook adapted for engaging the lower portion of that bead of a tire casing which is dropped into the drop-center of a rim supported on a tire stand, and means for supporting and manipulating said bead hook comprising a main lever pivoted to the tire stand, said bead hook having its hooked portion at one end and having its other end pivoted to said main lever, a rock shaft constituting the pivot for said main lever, and an operative connection between said rock shaft and said bead hook comprising a V-over-roller type of connection between said main lever and said bead hook, means extending from said rock shaft and connected with said V-over-roller connection for swinging it, said main lever and said bead hook in opposite directions as the rock shaft is rocked, said V-over-roller connection including means for biasing the V and the roller relatively toward each other whereby said bead hook, in one position of the V and roller, is biased toward the tire casing bead, and in the other position thereof is biased away from the bead.

5. A tire stand accessory comprising a bead engaging hook for the bead of a tire casing supported on a rim which in turn is supported by a tire stand, and means for supporting and manipulating said bead hook comprising a main lever pivoted to the tire stand, stop means on said main lever, said bead hook being pivoted to said main lever, a rock shaft, a manually operable lever therefor, and an operative connection between said rock shaft and said bead hook, comprising over-center mechanism resiliently biasing said bead hook toward movement in one direction relative to said main lever when the over-center mechanism is on one side of the center, and in the other direction relative to said lever when the over-center mechanism is on the other side of the center, means extending from said rock shaft and cooperating with said over-center mechanism for rocking the entire assembly of the main lever, over-center mechanism and bead hook in one direction to a position with the hooked portion of the hook adjacent the bead when further movement of the main lever is stopped by the engagement of said stop means with a portion of the stand, and thereafter effecting operation of the over-center mechanism for engaging the hook with the bead, subsequent movement of said manually operable lever in the opposite direction effecting spreading of the tire casing, continued movement of said manually operable lever in said other direction effecting changeover of said over-center mechanism upon sufficient resistance to the movement of said bead hook being offered by the tire casing, subsequent movement of said manually operable lever in the first direction releasing the hooked portion of said bead hook from the bead, whereupon said over-center mechanism swings the hook out of engagement with and away from the bead.

6. A tire stand accessory comprising a bead engaging hook for the bead of a tire casing supported on a rim which in turn is supported by a tire stand, and means for supporting and manipulating said bead hook comprising a main lever pivoted to the tire stand and having a limited movement in one direction, said bead hook being pivoted to said main lever, an operating lever for said bead hook, and an operative connection between said operating lever and said bead hook comprising V-over-roller mechanism resiliently biasing said hook operating lever toward movement in one direction relative to said main lever when the V-over-roller mechanism is on one side of the center and in the other direction relative to said main lever when the V-over-roller mechanism is on the other side of the center, said operating lever moving said main lever by resistance offered by said V-over-roller mechanism in one direction to position the hooked portion of the hook adjacent the bead when said main lever reaches said limit of movement and thereafter effect operation of the V-over-roller mechanism for engaging the hook with the bead, whereupon by subsequent movement of said operating lever in the opposite direction, the tire casing bead may be engaged and moved, continued movement of said operating lever in said other direction effecting a changeover of said V-over-roller mechanism upon sufficient resistance to the movement of said bead hook being offered by the tire casing, subsequent movement of said manually operated lever in the first direction releasing the hooked portion of said bead hook from the bead whereupon said V-over-roller mechanism swings the hook out of engagement with and away from the bead.

OTTO V. TEEGARDEN.

REFERENCES CITED

The following references are of record in the file of this patent:

UNITED STATES PATENTS

| Number | Name | Date |
| --- | --- | --- |
| 1,358,805 | Weaver et al. | Nov. 16, 1920 |
| 1,715,179 | Weaver et al. | May 28, 1929 |